United States Patent
Yoo et al.

(10) Patent No.: US 9,137,882 B2
(45) Date of Patent: Sep. 15, 2015

(54) ELECTROSTATIC CAPACITY TYPE TOUCH SCREEN PANEL FOR DISPLAY DEVICE AND METHOD OF MANUFACTURING THE SAME

(71) Applicant: LG DISPLAY CO., LTD., Seoul (KR)

(72) Inventors: Taeyeon Yoo, Goyang-si (KR); Hazoong Kim, Suwon-si (KR); Seunghyun Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 183 days.

(21) Appl. No.: 13/865,875

(22) Filed: Apr. 18, 2013

(65) Prior Publication Data

US 2013/0279063 A1    Oct. 24, 2013

(30) Foreign Application Priority Data

Apr. 19, 2012    (KR) .................. 10-2012-0041176

(51) Int. Cl.
*H05F 3/02* (2006.01)
*H05F 3/00* (2006.01)
*H01H 11/00* (2006.01)
*G06F 3/044* (2006.01)

(52) U.S. Cl.
CPC *H05F 3/00* (2013.01); *G06F 3/044* (2013.01); *H01H 11/00* (2013.01); *G06F 2203/04111* (2013.01); *Y10T 29/49105* (2015.01)

(58) Field of Classification Search
USPC ........................................... 361/220
See application file for complete search history.

(56) References Cited

U.S. PATENT DOCUMENTS

| | | | |
|---|---|---|---|
| 5,760,855 A * | 6/1998 | Nakase et al. | 349/40 |
| 2011/0141037 A1* | 6/2011 | Hwang et al. | 345/173 |
| 2011/0227839 A1* | 9/2011 | Rho et al. | 345/173 |
| 2012/0075218 A1* | 3/2012 | Lin et al. | 345/173 |
| 2012/0081333 A1* | 4/2012 | Ozeki et al. | 345/174 |
| 2012/0120011 A1* | 5/2012 | Teng et al. | 345/173 |
| 2012/0182230 A1* | 7/2012 | Wang et al. | 345/173 |
| 2012/0186966 A1* | 7/2012 | Chang et al. | 200/600 |
| 2012/0295071 A1* | 11/2012 | Sato et al. | 428/188 |
| 2013/0154979 A1* | 6/2013 | Li et al. | 345/173 |
| 2013/0229364 A1* | 9/2013 | Yu et al. | 345/173 |
| 2013/0279063 A1* | 10/2013 | Yoo et al. | 361/220 |
| 2014/0176825 A1* | 6/2014 | Lee et al. | 349/12 |

* cited by examiner

*Primary Examiner* — Ronald W Leja
(74) *Attorney, Agent, or Firm* — Birch, Stewart, Kolasch & Birch, LLP

(57) ABSTRACT

A touch screen panel includes a substrate having an electrode forming part, a routing wire forming part and a pad forming part; a plurality of first electrode serials arranged in a first direction in the electrode forming part; a plurality of second electrode serials arranged in a second direction crossing over the first direction in the electrode forming part, and electrically insulated from the plurality of first electrode serials by an insulation; and at least one static electricity discharging pattern formed in the electrode forming part, and connected with any one of the first electrode serials and the second electrode serials.

11 Claims, 6 Drawing Sheets

ELECTROSTATIC CAPACITY TYPE TOUCH SCREEN PANEL FOR DISPLAY DEVICE AND METHOD OF MANUFACTURING THE SAME

This application claims priority under U.S.C. §119(a) to Korean Paten Application No. 10-2012-0041176 filed on Apr. 19, 2012, which is incorporated by reference herein in its entirety.

BACKGROUND OF THE INVENTION

1. Field of the Invention

This disclosure relates to an electrostatic capacitive type touch screen panel for a display device, in particular an electrostatic capacitive type touch screen panel for a display device preventing it from being damaged by a static electricity, and a method of manufacturing the same.

2. Discussing of the Related Art

In recent years, display devices, such as a liquid crystal display, an electroluminescent display, and a plasma display panel, having a quick response speed, low power consumption, and an excellent color reproduction rate, have been in the spotlight. These display devices have been used for various electronic products such as a television, a monitor for a computer, a laptop computer, a mobile phone, a display unit of a refrigerator, a personal digital assistant, and an automated teller machine. In general, these display devices interface with various input devices such as a keyboard, a mouse, and a digitizer. However, in order to use a separate input device, such as a keyboard or mouse, a user has to deal with the inconveniences of learning how to use it and taking up space, thus making it difficult to improve the degree of completion of the product. Therefore, the demand for input devices that are convenient and easy to use and reduce an erroneous operation is growing more and more. In response to this demand, a touch screen panel for enabling a user to input information by directly touching the screen with their hand or a pen was suggested.

The touch sensor has a simple configuration capable of reducing erroneous operations. The user can also perform an input action without using a separate input device, and can quickly and easily manipulate a device through contents displayed on a screen. Accordingly, the touch sensor has been applied to various display devices.

Touch screen panels are classified into a resistive type, a capacitive type, an electromagnetic type and so on according to a detection method of a touched position. The resistive type touch screen panel detects a touched position by a voltage gradient according to resistance in a state that a DC voltage is applied to metal electrodes formed on an upper plate or a low plate. The capacitive type touch screen panel senses a touched position according to a difference in capacitance created in an upper or lower plate when the user touches an equipotential conductive film formed on the upper or lower plate. The electromagnetic type touch screen panel detects a touched position by reading an LC value induced as an electromagnetic pen touches a conductive film.

Figure 1:
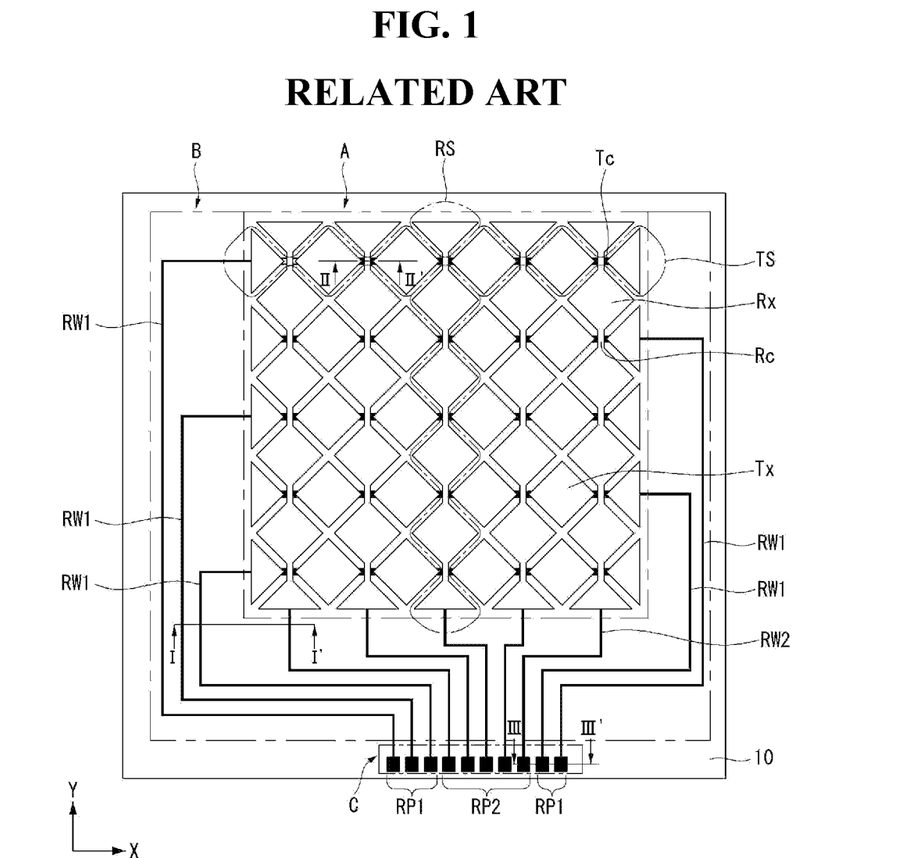
FIG. 1 is a top planar view illustrating an electrostatic capacitive type touch screen panel for a display device according to the related art.

Hereinafter, a related art electrostatic capacitive type touch screen panel for a display device will be described with reference to FIGS. 1 and 2. FIG. 1 is a plan view of a related art electrostatic capacitive type touch screen panel, and FIG. 2 is a cross-sectional view taken along lines I-I', II-II' and III-III' of FIG. 1.

Figure 2:
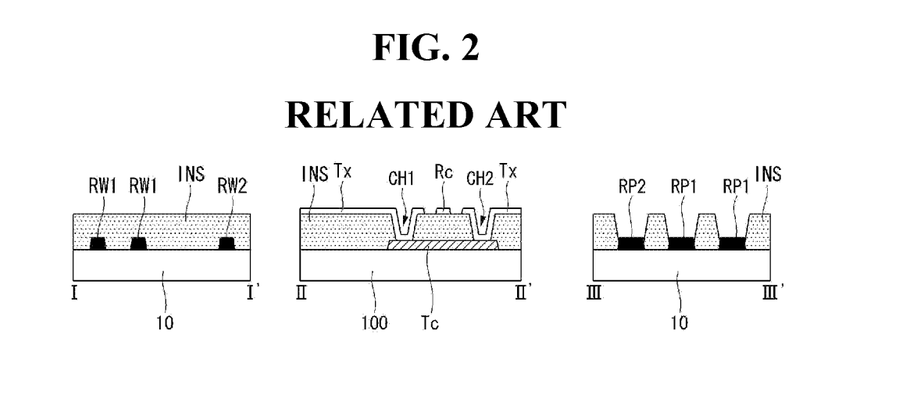
FIG. 2 is a cross-sectional view taken alone lines I-I', II-II' and III-III' of the touch screen panel shown in FIG. 1.

Referring to FIGS. 1 and 2, the related art electrostatic capacitive type touch screen panel for a display device includes an electrode forming part A, a routing wire forming part B, and a pad forming part C.

The electrode forming part A includes a plurality of first electrodes TS formed on a substrate 10 and arranged in parallel in a first direction (e.g., the X-axis direction) and a plurality of second electrodes RS arranged in a second direction (e.g., the Y-axis direction) to cross over the first electrodes TS. The first electrodes TS and the second electrodes RS cross over each other, but they are kept electrically insulated by an insulation layer NS. Each of the first electrodes TS includes a plurality of first electrode patterns Tx separated from each other and a plurality of first connection pattern Tc of which each connects neighboring first electrode patterns Tx to each other. Herein, the first connection pattern Tc connects the neighboring first electrode patterns Tx to each other through first and second contact holes CH1 and CH2 formed in the insulation layer INS. Each of the second electrodes RS also a plurality of second electrode patterns Rx and a plurality of second connection pattern Rc of which each connects neighboring second electrodes Rx to each other. However the second electrode patterns Rx are not separated from each other, but integral with the second connection patterns Rc.

The routing wire forming part B includes a plurality of first routing wires RW1 and a plurality of second routing wires RW2 which are formed outside the electrode forming part A. The plurality of first routing wires RW1 are connected with the first electrodes TS, respectively, and the plurality of second routing wires RW2 are connected with the second electrodes RS, respectively. The first and second routing wires RW1 and RW2 are protected by the insulating layer NS covering them.

The pad forming part C includes a plurality of first pads RP1 connected to the plurality of first electrodes TS via the plurality of first routing wires RW1 and a plurality of second pads RP2 connected to the plurality of second electrodes RS via the plurality of second routing wires RW2.

In the related art electrostatic capacitive type touch screen panel, the each of the first connection patterns Tc to connect the neighboring first electrode patterns TS of the electrode forming part A via the first and second contact holes CH1 and CH2. In general, a static electricity may be induced or introduced into the touch screen panel during a process of fabricating the touch screen panel for the display device such as a panel fabricating process, and a module fabricating process, or a product transportation or a product use. In particular, if a static electricity enters from the outside to first and second electrode patterns Ts and Rs during the panel fabricating process, the module fabricating process, or the product transportation, and so on, a temporarily high current abruptly flows through the first connection patterns Tc via the first electrode patterns Tx formed the first and second contact holes CH1 and CH2. Accordingly, the first and second contact holes CH1 and CH2 or the first connection pattern Tc may be damaged by the high current due to the static electricity because the first and second electrode patterns Tx and Rx, the first and second connection patterns Tc and Rc, and the contact holes CH1 and CH2 are made so small to improve touch accuracy o the touch screen panel.

SUMMARY OF THE INVENTION

Embodiments of the invention provide a touch screen panel for a display device capable of preventing the touch screen panel from being damaged by the static electricity introduced from the outside during a panel fabricating process, a module fabricating process, a product transportation or a product use, and a method of manufacturing the same.

In one aspect, there is a touch screen panel for a display device includes a substrate including an electrode forming part, a routing wire forming part and a pad forming part; a plurality of first electrode serials arranged in a first direction in the electrode forming part; a plurality of second electrode serials arranged in a second direction crossing over the first direction in the electrode forming part, and electrically insulated from the plurality of first electrode serials by an insulation; and at least one static electricity discharging pattern formed in the electrode forming part, and connected with any one of the first electrode serials and the second electrode serials.

In the touch screen panel, wherein each of the plurality of first electrode serials includes a plurality of a plurality of first electrode patterns formed on the insulation layer, and at least one first connection pattern which is formed on the substrate and connects neighboring first electrode patterns to each other, wherein the first connection pattern connects the neighboring first electrode patterns.

In the touch screen panel, the first connection pattern connects the neighboring first electrode patterns via first and second contact holes formed in the insulation layer.

In the touch screen panel, each of the second electrode serials includes a plurality of second electrode patterns formed on the insulation layer without being in contact with the first electrode pattern, and at least one second connection pattern formed on the insulation layer and connecting neighboring second electrode patterns.

In the touch screen panel, the static electricity discharging pattern is formed on the substrate without being in contact with the first connection patterns, and connected with the first electrode pattern via a third contact hole.

In the touch screen panel, a portion of the static electricity discharging pattern is overlapped with the second electrode pattern without being in contact with the second electrode pattern.

The touch screen panel further includes a plurality of first routing wires formed in the routing wire forming part, and connected with the first electrode serials, respectively; and a plurality of second routing wires formed in the routing wire forming part, and connected with the second electrode serials, respectively.

In the touch screen panel, a thickness of the first connection pattern is set to 1/12 to 1/4 of a thickness of the static electricity discharging pattern.

In the touch screen panel, each of the first electrode patterns has a polygonal shape, one static electricity discharging pattern is connected with each side of the first electrode pattern.

In another aspect, there is provided a method of manufacturing a touch screen panel for a display device includes preparing a substrate including an electrode forming part, a routing wire forming part and a pad forming part; forming a plurality of static electricity discharging patterns in the electrode forming part and a plurality of first and second routing wires in the routing wire forming part of the substrate using a first mask process; forming a plurality of first connection patterns arranged in a first direction in the electrode forming part without being in contact with the static electricity discharging patterns using a second mask process; forming an insulation layer on an entire surface of the substrate on which the static electricity discharging patterns, the first and second routing wires and the first connection patterns are formed, and forming first and second contact holes exposing portions of each first connection pattern and third contact hole exposing at least one portion of each static electricity discharging pattern using a third mask process; and forming a plurality of first electrode patterns arranged in parallel in a first direction and a plurality of second electrode patterns arranged in parallel in a second direction crossing over the first direction on the insulation layer using a fourth mask process, wherein neighboring first electrode patterns are connected to each other via the first connection pattern exposed by the first and second contact holes, and the static electricity discharging pattern is in contact with the first electrode pattern via the third contact hole.

In the method, the first mask process includes forming a first conductive layer on an entire surface of the substrate; forming a first photo-resist pattern through a photolithography process using a first mask; and exposing and developing the first conductive layer using the first photo-resist pattern as a mask, and removing the exposed and developed portions of the first conductive layer by an etching process, thereby forming the static electricity discharging patterns in the electrode forming part and the first and second routing wires in the routing wire forming part, wherein the static electricity discharging pattern has a first thickness.

In the method, the second mask process includes forming a first transparent conductive layer on the insulation layer in which the first to third contact holes are formed; forming a second photo-resist pattern through a photolithography process using a second mask; and exposing and developing the first transparent conductive layer using the second photo-resist pattern as a mask, and removing the exposed and developed portions of the first transparent conductive layer by an etching process, thereby forming the first connection patterns in the electrode forming part, wherein the first connection pattern has a second thickness smaller than the first thickness.

According to exemplary embodiments of the invention, it is possible to prevent the touch screen panel from being damaged by the static electricity introduced from the outside during a panel fabricating process, a module fabricating process, a product transportation or a product use.

BRIEF DESCRIPTION OF THE DRAWINGS

The teachings of the embodiments can be readily understood by considering the following detailed description in conjunction with the accompanying drawings.

DETAILED DESCRIPTION OF EMBODIMENTS

Hereinafter, exemplary embodiments of this disclosure will be described in detail with reference to the accompanying drawings, wherein same reference numerals may be used to denote the same or substantially the same elements throughout the specification and the drawings.

Figure 3:
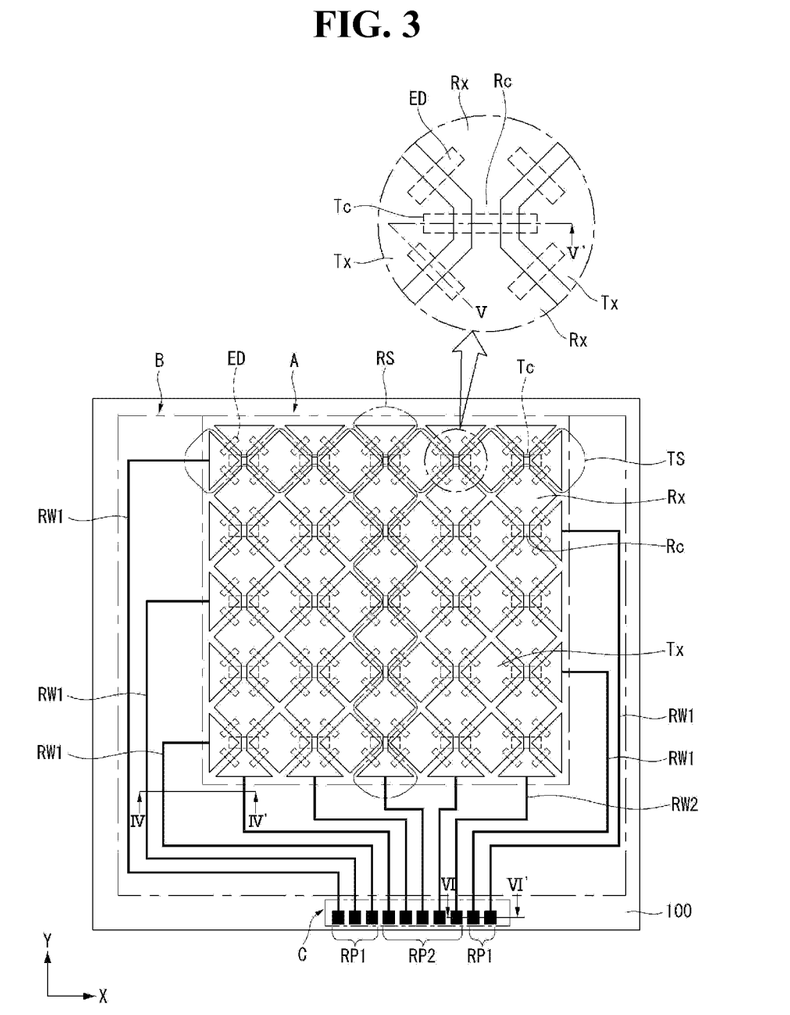
FIG. 3 is a top planar view illustrating a touch screen panel according to an exemplary embodiment of the invention.

A electrostatic capacitive type touch screen panel for a display device according to an exemplary embodiment of the invention is described in detail with reference to FIGS. 3 and 4. FIG. 3 is a top planar view illustrating a touch screen panel according to an exemplary embodiment of the invention, and FIG. 4 is a cross-sectional view taken alone lines IV-IV', V-V' and VI-VI' of the touch screen panel shown in FIG. 3.

Figure 4:
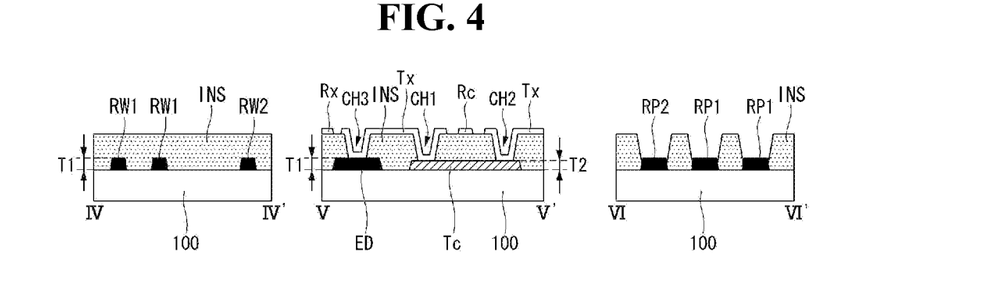
FIG. 4 is a cross-sectional view taken alone lines IV-IV', V-V' and VI-VI' of the touch screen panel shown in FIG. 3.

Referring to FIGS. 3 and 4, the electrostatic capacitive type touch screen panel for a display device (hereinafter, referred to as "touch screen panel") according to an exemplary embodiment of the present invention includes an electrode forming part A, a routing wire forming part B formed outside the electrode forming part A, and a pad forming part C formed on one side of the routing wire forming part B.

The electrode forming part A includes a plurality of first electrode serials (or driving electrode serials) TS arranged in parallel in a first direction (e.g., X-axis direction) and a plurality of second electrode serials (or sensing electrode serials) RS arranged in a second direction (e.g., Y-axis direction) to cross over the first electrode serials TS with an insulation layer INS therebetween. The terminology "electrode serial" recited in this disclosure means that a plurality of electrode patterns are connected to each other to form one electrical line.

Each of the first electrode serials TS includes a plurality of first electrode patterns Tx and first connecting patterns Tc for connecting neighboring first electrode patterns Tx. Each of the second electrode serials RS includes second electrode patterns Rx and second connecting patterns 153 Rc connecting neighboring second electrode patterns Rx. Each of the first and second electrode patterns Tx and Rx has a shape such as triangular, rectangular, diamond, polygonal, circular, or elliptical shape. The first connection patterns Tc are formed on the substrate 100, and the first and second electrode patterns and the second the connection patterns Tx, Rx and Rc are formed on an insulation layer INS covering the first connection layer Tc.

The first connection pattern Tc is electrically insulated from the second connection pattern Rc by the insulation layer NS because the first electrode serial Ts crosses over the second electrode serial RS with the insulation therebetween. Neighboring first electrode patterns Tx are connected to each other by the first connection pattern Tc via the first and second contact holes CH1 and CH2 formed in the insulation layer INS. Thus, although the first electrode patterns Tx are separated from each other, the first electrode patterns Tx and the first connection patterns Tc function as electrode lines in parallel with the first direction because the first electrode patterns Tc are connected by the first connection patterns Rc.

The electrode forming part A includes static electricity discharging patterns ED formed on the substrate 100. The static electricity discharging pattern ED is connected with the first electrode pattern Tx formed on the insulation layer INS via a third contact hole CH3 in the insulation layer INS. The static electricity discharging pattern ED is overlapped with a portion of the second electrode pattern Rx without being in contact with the second electrode pattern Rx. Although the static electricity discharging patter ED is connected with the first electrode pattern Tx and overlapped with a portion of the second electrode pattern Rx, but the invention is not limited thereto. For example, the static electricity discharging patter ED may be connected with the first electrode pattern Tx formed on the insulation layer NS via the third contact hole CH3, and may be not overlapped with the second electrode pattern Rx. Or otherwise, the static electricity discharging patter ED may be connected with the second electrode pattern Rx formed on the insulation layer NS via the third contact hole CH3. Alternatively, the static electricity discharging patter ED may be connected with the second pattern Rx, and may be overlapped with the first electrode pattern Tx without being in contact with the first electrode pattern Tx.

In the exemplary embodiment shown in FIGS. 3 and 4, four static electricity discharging patter ED are connected to one first electrode pattern Tx, but the invention in not limited thereto. The number of the static electricity discharging patter ED connected with one first electrode pattern Tx may be appropriately modified, when necessary.

In the exemplary embodiment shown in FIGS. 3 and 4, a thickness T2 of the first connection pattern Tc is smaller than a thickness T1 of the static electricity discharging patter ED. It is preferable that the thickness T2 of the first connection pattern Tc is set to $1/12$ to $1/4$ of the thickness T1 of the static electricity discharging pattern ED. Like this, if the thickness T1 of the static electricity discharging pattern ED is thicker than the thickness T2 of the first connection pattern Tc, there is step coverage therebetween due to a thickness difference (T2−T1). If a static electricity is generated due to the step coverage, the static electricity is guided to the static electricity discharging pattern ED along the first electrode pattern Tx. Accordingly, it is possible to prevent the first and second contact holes and the first connection pattern CH1, CH2 and Tc from being damaged because the static electricity from the outside is guided into the static electricity discharging pattern ED having a low resistivity. Herein, the static electricity from the outside may be disappeared by the static electricity discharging pattern ED. Or otherwise the static electricity from the outside may damage the third contact hole CH3 or the static electricity discharging pattern ED. However, the touch screen panel may be protected from the static electricity because the first and second contact holes and the first connection pattern CH1, CH2 and Tc are not destroyed.

On the other hand, the static electricity discharging pattern ED has a bar shape in the embodiment of FIGS. 2 and 3, the invention is not limited thereto. The static electricity discharging pattern ED may has a arbitrary shape.

The routing wire forming part B is formed outside the electrode forming part A, and includes a plurality of first routing wires RW1 and a plurality of second routing wires RW2. The plurality of first routing wires RW1 are connected to the plurality of first electrode serials TS, respectively. And also, the plurality of second routing wires RW2 are connected to the plurality of second electrode serials RS, respectively.

The pad forming part C includes a plurality of first pads RP1 connected to the plurality of first electrode serials TS via the plurality of first routing wires RW1. The pad forming part C includes a plurality of second pads RP2 connected to the plurality of second electrode serials RS via the plurality of second routing wires RW2.

In the exemplary embodiment shown in FIGS. 3 and 4, the first electrode patterns Tx, the first connection patterns Tc, the second electrode patterns Rx, the second connection patterns Rc are made of a transparent conductive material such as indium tin oxide (ITO), indium zinc oxide (IZO), gallium-doped zinc oxide (GZO), metal mesh type transparent electrode material, metal nano-wire, and carbon-based transparent electrode material. And, the static electricity discharging patterns ED, the first and second routing wires RW1 and RW2, and the first and second pads RP1 and RP2 are made of metal material such as Al, AlNd, MO, MoTi, Cu, CuOx, Cr, Ag, and Ag-based alloy. However the invention is not limited thereto. For example, the first and second routing wires RW1 and RW2 and the first and second pads RP1 and RP2 may be made of double layers including a lower layer made of the transparent conductive material and an upper layer made of the metal material.

In the exemplary embodiment shown in FIGS. 3 and 4, the insulation layer NS is entirely formed on the substrate 100 on which the first connection patterns Tc, the static electricity discharging patterns ED, the first and second routing wires RW1 and RW2, and the first and second pads RP1 and RP2 are formed. And also the first to fourth contact holes CH1 to CH5 are formed in the insulation layer INS. The first and second contact holes CH1 and CH2 expose portions of each first connection pattern Tc, the third contact hole CH3 exposes a portion of each static electricity discharging pattern ED, the fourth contact hole CH4 (FIG. 7A) exposes each first routing wire RW1, and the fifth contact hole CH5 (FIG. 7A) exposes each second routing wire RW2. The insulation layer NS is made of inorganic insulation material such as SiNx, and SiOx or organic insulation material such as photo sensitive resin. However, the insulation material is not limited thereto. If the insulation layer INS is made of SiNx, it is possible to prevent from the product being damaged during a panel fabricating process, a module fabricating process, a product transportation or a product use because SiNx has a high hardness to resist scratches.

Hereinafter, a method of manufacturing the electrostatic capacitive type touch screen panel for a display device according to an exemplary embodiment of the invention will be described with reference to FIGS. 5A to 7B.

Figure 5A:
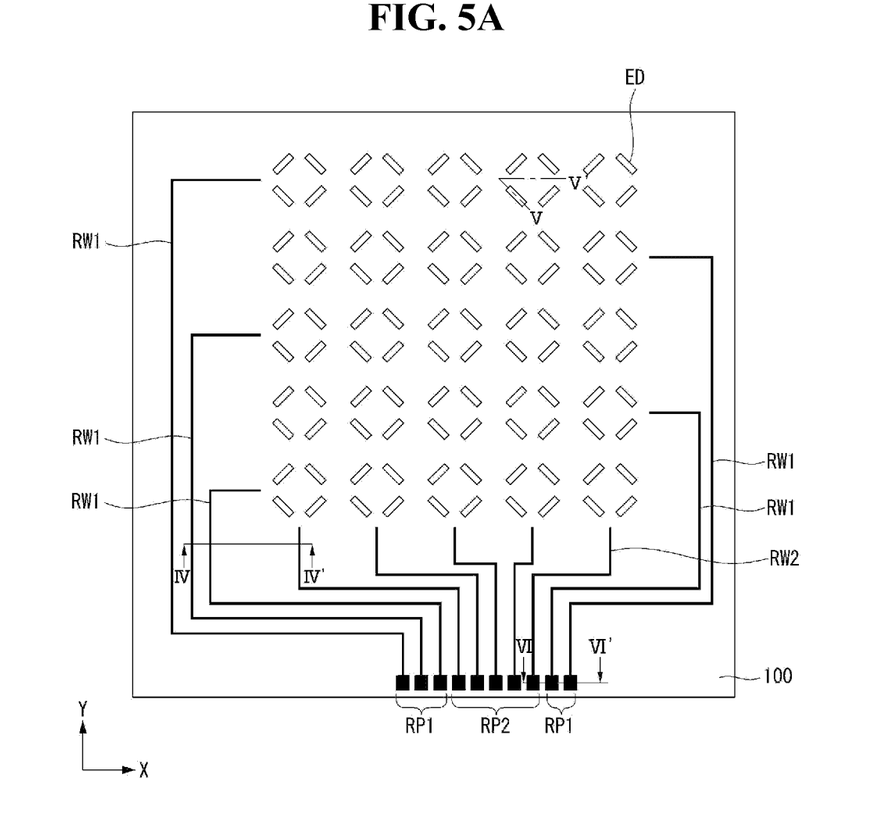
FIG. 5A is a top planar view illustrating a first mask process for manufacturing the touch screen panel according to the embodiment of the invention.
Figure 5B:
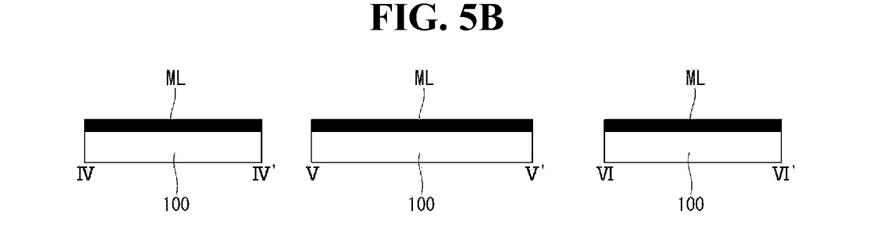
FIGS. 5B and 5C are a cross-sectional view taken along lines IV-IV', V-V' and VI-VI' shown in FIG. 5A.
Figure 5C:
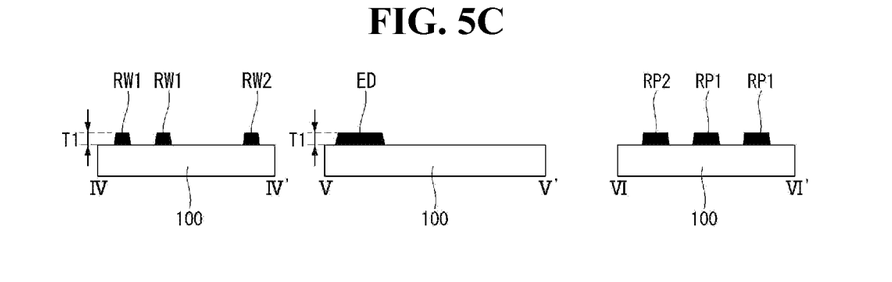

FIG. 5A is a top planar view illustrating a first mask process for manufacturing the touch screen panel according to the embodiment of the invention, and FIGS. 5B and 5C are a cross-sectional view taken along lines IV-IV', V-V' and VI-VI' shown in FIG. 5A.

Referring to FIGS. 5A and 5B, a first conductive pattern group is formed on a substrate 100 through a first mask process. The first conductive pattern group includes a plurality of static electricity discharging patterns ED, a plurality of first and second routing wires RW1 and RW2, and a plurality of first and second pads RP1 and RP2.

More specifically, the first conductive layer ML is entirely formed on the substrate 100 by a deposition process such as a sputtering process as shown in FIG. 5. As the first conductive layer ML, metal material such as Al, AlNd, MO, MoTi, Cu, CuOx, Cr, Ag, and Ag-based alloy may be used.

After a photo-resist is entirely applied to the substrate 100 on which the first conductive layer ML is deposited, a first photo-resist pattern (not shown) exposing portion of the first conductive layer is formed through a photolithography process using a first mask. After the first conductive layer ML is exposed and developed using the first photo-resist pattern as a mask, the first conductive layer ML exposed via the first photo-resist pattern is removed by a wet etching. The first photo-resist pattern is then removed by an ashing process, thereby forming a plurality of static electricity discharging patterns ED having a first thickness T1, a plurality of first and second routing wires RW1 and RW2, and a plurality of first and second pads RP1 and RP2.

Figure 6A:
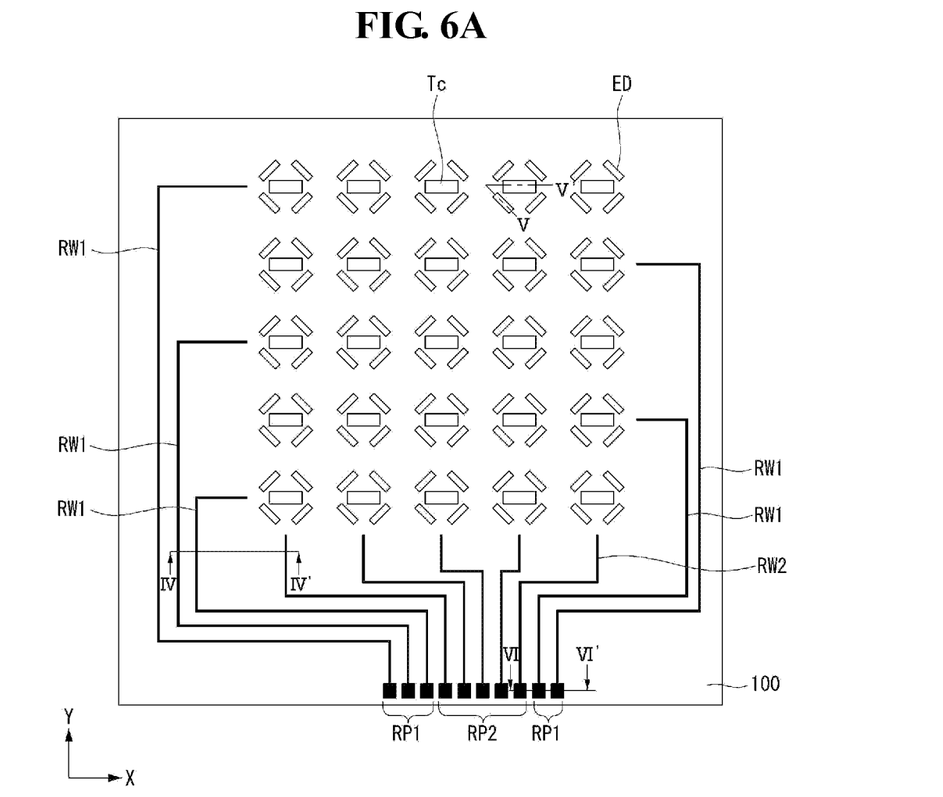
FIG. 6A is a top planar view illustrating a second mask process for manufacturing the touch screen panel according to the embodiment of the invention.
Figure 6B:
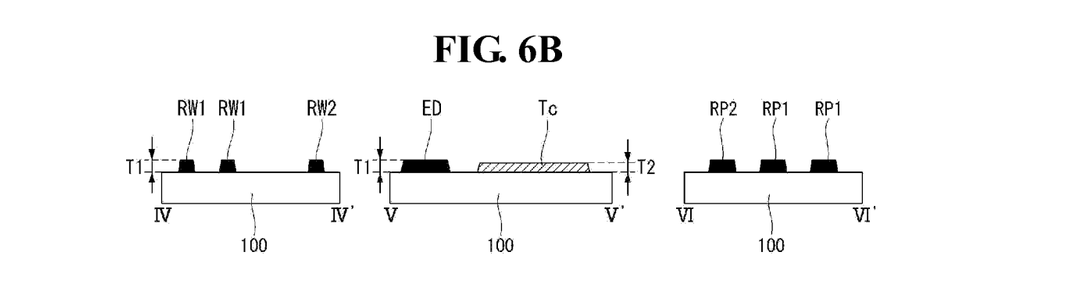
FIG. 6B is a cross-sectional view taken along lines IV-IV', V-V' and VI-VI' shown in FIG. 6A.

FIG. 6A is a top planar view illustrating a second mask process for manufacturing the touch screen panel according to the embodiment of the invention, and FIG. 6B is a cross-sectional view taken along lines IV-IV', V-V' and VI-VI' shown in FIG. 6A.

Referring to FIGS. 6A and 6B, a first transparent conductive layer is formed as a second conductive layer on the substrate 100 on which the first conductive pattern group is formed. After a photo-resist is entirely applied to the substrate 100 on which the first conductive pattern group and the first transparent conductive layer are formed, a second photo-resist pattern (not shown) exposing portions of the first transparent conductive layer is formed through a photolithography process using a second mask. After the first transparent conductive layer is exposed and developed using the second photo-resist pattern as a mask, the first transparent conductive layer exposed via the second photo-resist pattern is removed by an etching. The second photo-resist pattern is then removed by an ashing process, thereby forming a plurality of first connection patterns Tc having a second thickness T2 which is smaller than the thickness T1. It is preferable that the second thickness T2 is set to $\frac{1}{12}$ to $\frac{1}{4}$ of the first thickness T1. As the first transparent conductive layer, indium tin oxide (ITO), indium zinc oxide (IZO), gallium-doped zinc oxide (GZO), metal mesh type transparent electrode material, metal nano-wire, and carbon-based transparent electrode material may be used.

Figure 7A:
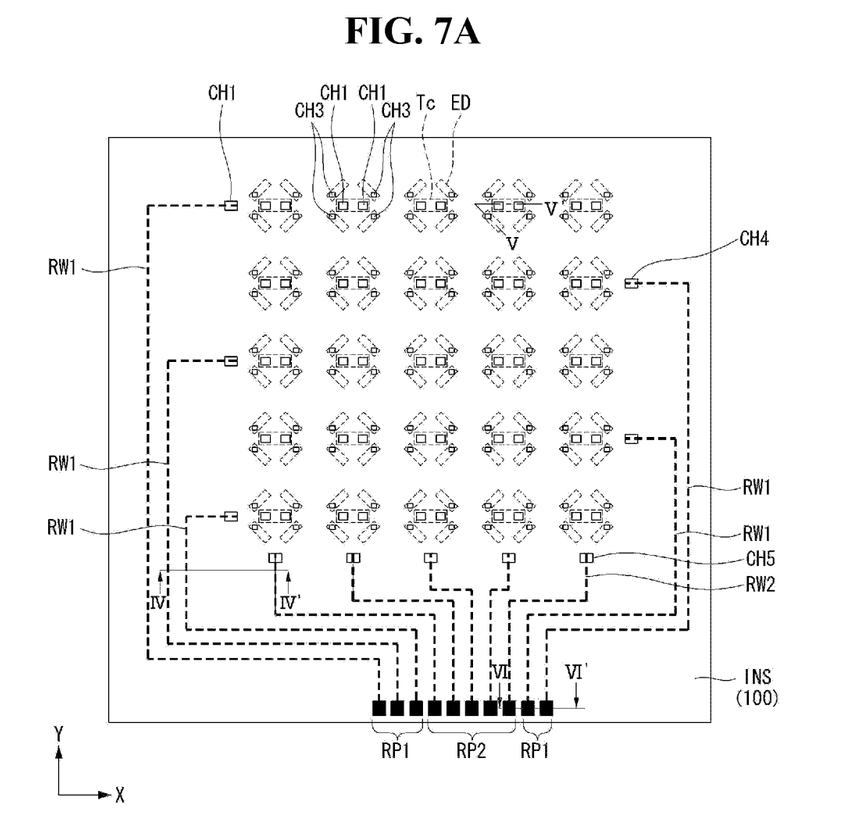
FIG. 7A is a top planar view illustrating a third mask process for manufacturing the touch screen panel according to the embodiment of the invention.
Figure 7B:
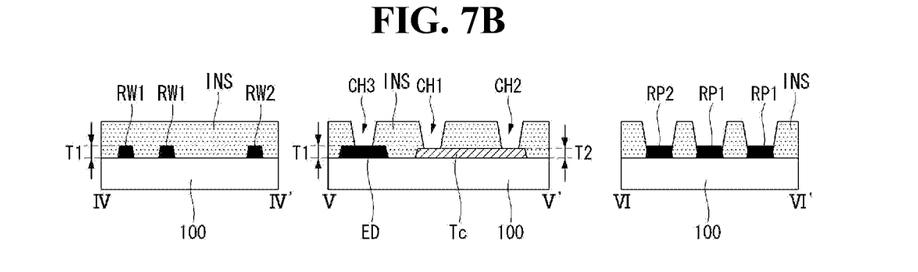
FIG. 7B is a cross-sectional view taken along lines IV-IV', V-V' and VI-VI' shown in FIG. 7A.

FIG. 7A is a top planar view illustrating a third mask process for manufacturing the touch screen panel according to the embodiment of the invention, and FIG. 7B is a cross-sectional view taken along lines IV-IV', V-V' and VI-VI' shown in FIG. 7A.

The dot lines shown in FIG. 7A indicates first and second routing wires RW1 and RW2, which are to help understanding of construction according to the invention.

Referring to FIGS. 7A and 7B, an insulation layer INS is entirely formed on the substrate 100 on which the static electricity discharging patterns ED, the first connection patterns Tc, the first and second routing wires RW1 and RW2, and the first and second pads RP1 and RP2 are formed by a deposition process such as a sputtering process. As the insulation layer INS, inorganic insulation material such as SiNx, and SiOx, organic insulation material such as photo sensitive resin, or combination of them may be used.

A photoresist layer is entirely formed on the insulation layer NS and a third photoresist pattern (not shown) is formed to expose regions of the insulation layer INS in which contact holes are to be formed through a photolithography process using a third mask. The insulation layer NS exposed via the third photoresist pattern is removed by a dry etching. The third photoresist pattern is removed by an ashing process, thereby forming the first to fifth contact holes CH1 to CH5 as shown in FIGS. 7A and 7B. The first and second contact holes CH1 and CH2 expose portions of each first connection pattern Tc, the third contact hole CH3 exposes a portion of the static electricity discharging pattern ED, the fourth contact holes CH4 exposes a portion of each first routing wire RW1, and the fifth contact hole CH5 exposes a portion of each second routing wire WR2.

In the exemplary embodiment of the invention, it is drawn that each of the first to fifth contact holes CH1 to CH5 has a rectangular shape in a cross-sectional view, however the invention is not limited thereto. For example, the shape includes a circular, elliptical, polygonal, or irregular shape.

Figure 8A:
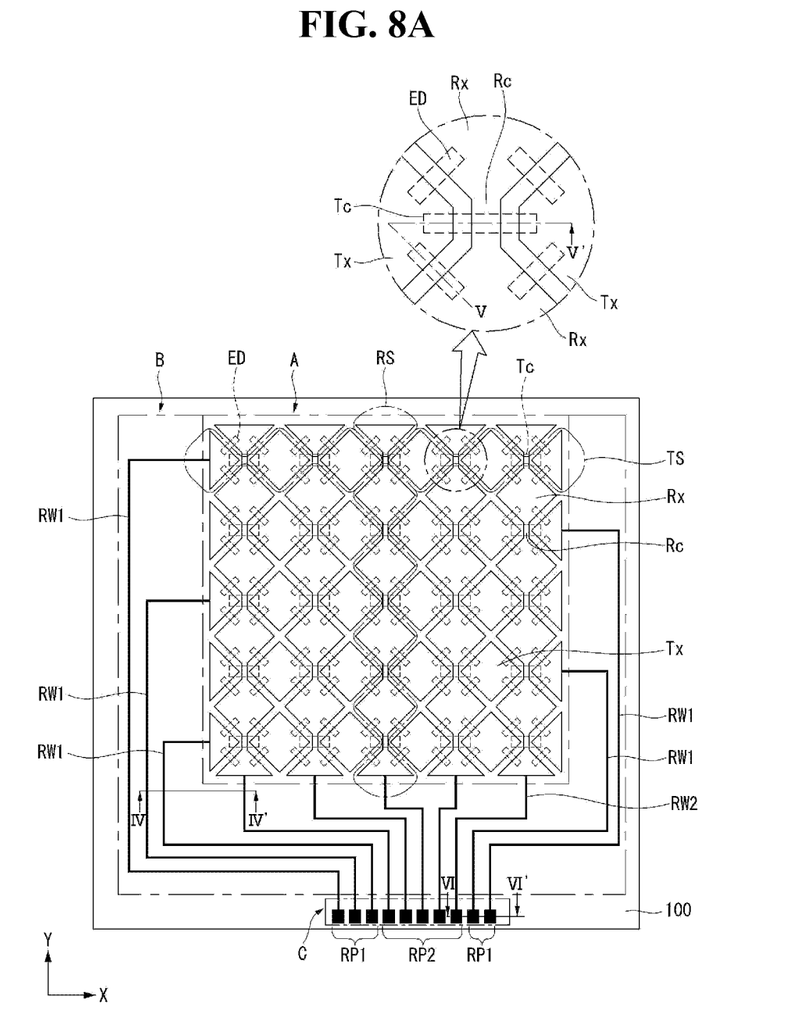
FIG. 8A is a top planar view illustrating a fourth mask process for manufacturing the touch screen panel according to the embodiment of the invention.
Figure 8B:
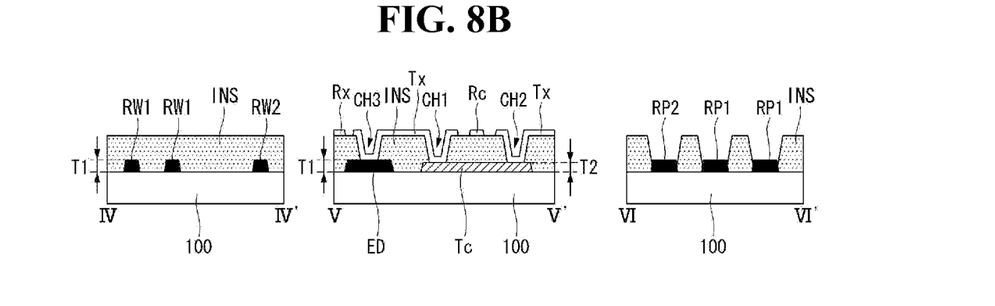
FIG. 8B is a cross-sectional view taken along lines IV-IV', V-V' and VI-VI' shown in FIG. 8A.

FIG. 8A is a top planar view illustrating a fourth mask process for manufacturing the touch screen panel according to the embodiment of the invention, and FIG. 8B is a cross-sectional view taken along lines IV-IV', V-V' and VI-VI' shown in FIG. 8A.

Referring to FIGS. 8A and 8B, a second conductive pattern group is formed on the insulation layer INS in which the first to fifth contact holes CH1 CH5 are formed. The second conductive pattern group includes a plurality of first electrode patterns Tx arranged in parallel in a first direction (e.g., X-axis direction) and a plurality of second electrode serials RS arranged in a second direction (e.g., Y-axis direction) to cross over the first electrode patterns Rx.

More specifically, a second transparent conductive layer is entirely formed as a fourth conductive layer on the insulation layer INS in which the first to fifth contact holes CH1 to CH5 through a deposition process such as a sputtering process. After a photoresist layer is entirely formed on the second transparent conductive layer INS, a fourth photo-resist pattern (not shown) is formed through a photolithography process using a fourth mask. The photo-resist pattern exposes regions excluding areas which the first electrode patterns Rx and the second electrode serials RS are formed. After the second transparent conductive layer ML is exposed and developed using the fourth photo-resist pattern as a mask, the second transparent conductive layer exposed via the fourth photo-resist pattern is removed by a wet etching. The fourth photo-resist pattern is then removed by an ashing process, thereby forming the plurality of first electrode patterns Tx arranged in parallel in the first direction and the plurality of second electrode serials RS arranged in parallel in the second direction crossing over the first direction.

The neighboring first electrode patterns Tx are connected to each other by the first connection pattern Tc via the first and second contact holes CH1 and CH2, thereby forming first electrode serials TS in parallel in the first direction. Each of the first electrode patterns Tx is connected to the static electricity discharging pattern ED via the third contact hole CH3.

Each of the second electrode serials RS includes a plurality of second electrode patterns Rx and a plurality of second connection patterns Rc of which each connects neighboring second electrode patterns Rx.

Each of the first and second electrode patterns Tx and Rx has a shape such as triangular, rectangular, diamond, polygonal, circular, or elliptical shape. However, the invention is not limited thereto. The first and second electrode patterns Tx and Rx may have an arbitrary shape. In the exemplary embodiment, the first electrode patterns Tx are separated from each other on the insulation layer INS, the neighboring first electrode patterns TX are connected to each other by the first connection pattern Tc formed between the substrate 100 and the insulation layer NS, and the second electrode patterns Rx are integral with the second connection patterns Rc on the insulation layer NS. But the first electrode patterns may be integral with the first connection patterns on the insulation layer, the second electrode patterns may be separated from each other. In this case, neighboring second electrode patterns should be connected to each other by the second connection patterns formed between the substrate and the insulation layer.

According to the exemplary embodiment of the invention, it is possible to cancel the static electricity introduced from the outside by forming the static electricity discharging patterns ED in the electrode forming part A. Accordingly, it is possible to prevent the touch screen panel from being damaged by the static electricity introduced from the outside during a panel fabricating process, a module fabricating process, a product transportation or a product use.

The following table 1 shows an experimental result measuring voltage levels when a related art touch screen panel and the touch screen panel according to the invention were damaged after different voltages were applied to the both touch screen panel, respectively. The applying voltages were increased every 0.1 kV from the 2.5 kV whenever the voltage was applied thereto. The voltage levels damaging the both touch screen panels were measured as table 1. The voltage levels includes individual values measured at three times and a mean value thereof.

TABLE 1

|  | first measuring value | second measuring value | third measuring value | Mean value |
|---|---|---|---|---|
| a related art | 3.3 kV | 2.8 kV | 2.5 kV | 2.9 kV |
| the invention | 4.8 kV | 5.0 kV | 4.7 kV | 4.8 kV |

From the above experimental result, it is appreciated that the related art touch screen panel was damaged at an average voltage 2.9 kV, and the touch screen panel according to the invention was damaged at an average voltage 4.8 kV. Accordingly, it is possible to effectively prevent the touch screen panel from being damaged by the static electricity.

The touch screen panel according to the exemplary embodiments of the present invention may be applied to a display device including a liquid crystal display (LCD), a field emission display (FED), a plasma display panel (PDP), an electroluminescence device (EL), an electrophoresis display, and so on. In this case, the substrate of the touch screen panel according to the exemplary embodiments of the present invention can be used as the substrate of the display device.

From the above description, it will be apparent to those skilled in the art that various changes and modifications can be made without departing from the technical spirit of the present invention. Accordingly, the scope of the present invention should not be limited by the exemplary embodiments, but should be defined by the appended claims.

What is claimed is:

1. A touch screen panel comprising:
   a substrate including an electrode part, a routing wire part and a pad part;
   a plurality of first electrode serials arranged in a first direction in the electrode part;
   a plurality of second electrode serials arranged in a second direction crossing over the first direction in the electrode part, and electrically insulated from the plurality of first electrode serials by an insulation layer; and
   at least one static electricity discharging pattern in the electrode part, and connected with any one of the first electrode serials and the second electrode serials,
   wherein each of the plurality of first electrode serials includes a plurality of first electrode patterns on the insulation layer, and at least one first connection pattern which is on the substrate and connects neighboring first electrode patterns to each other,
   wherein each of the plurality of second electrode serials includes:
   a plurality of second electrode patterns on the insulation layer without being in contact with the first electrode patterns; and
   at least one second connection pattern on the insulation layer and connecting neighboring second electrode patterns,
   wherein the static electricity discharging pattern is on the substrate without being in direct contact with both the first connection patterns and the second connection patterns, and wherein a portion of the static electricity discharging pattern is overlapped with both at least one of the first electrode patterns and at least one of the second electrode patterns.

2. The touch screen panel of claim 1, wherein the first connection pattern connects the neighboring first electrode patterns via first and second contact holes in the insulation layer.

3. The touch screen panel of claim 1, wherein the static electricity discharging pattern is connected with any one of the first electrode patterns and the second electrode patterns via a third contact hole.

4. The touch screen panel of claim 3, further comprising:
a plurality of first routing wires in the routing wire part, and connected with the first electrode serials, respectively; and
a plurality of second routing wires in the routing wire part, and connected with the second electrode serials, respectively.

5. The touch screen panel of claim 1, wherein a thickness of the first connection pattern is set to $1/12$ to $1/4$ of a thickness of the static electricity discharging pattern.

6. The touch screen panel of claim 1, wherein each of the first electrode patterns has a polygonal shape and each side is connected to one static electricity discharging pattern.

7. A method of manufacturing a touch screen panel, the method comprising:
preparing a substrate including an electrode forming part, a routing wire forming part and a pad forming part;
forming a plurality of static electricity discharging patterns in the electrode forming part and a plurality of first and second routing wires in the routing wire forming part of the substrate using a first mask process;
forming a plurality of first connection patterns arranged in a first direction in the electrode forming part without being in contact with the static electricity discharging patterns using a second mask process;
forming an insulation layer on an entire surface of the substrate on which the static electricity discharging patterns, the first and second routing wires and the first connection patterns are formed, and forming first and second contact holes exposing portions of each first connection pattern and third contact hole exposing at least one portion of each static electricity discharging pattern using a third mask process; and
forming a plurality of first electrode patterns arranged in parallel in a first direction and a plurality of second electrode patterns arranged in parallel in a second direction crossing over the first direction on the insulation layer using a fourth mask process,
wherein neighboring first electrode patterns are connected to each other via the first connection pattern exposed by the first and second contact holes, and the static electricity discharging pattern is in contact with one of the first electrode patterns via the third contact hole,
wherein each of the static electricity discharging patterns is on the substrate without being in direct contact with both the first connection patterns and the second connection patterns, and
wherein a portion of each of the static electricity discharging patterns is overlapped with both at least one of the first electrode patterns and at least one of the second electrode patterns.

8. The method of claim 7, wherein the first mask process includes:
forming a first conductive layer on an entire surface of the substrate;
forming a first photo-resist pattern through a photolithography process using a first mask; and
exposing and developing the first conductive layer using the first photo-resist pattern as a mask, and removing the exposed and developed portions of the first conductive layer by an etching process, thereby forming the static electricity discharging patterns in the electrode forming part and the first and second routing wires in the routing wire forming part, wherein the static electricity discharging pattern has a first thickness.

9. The method of claim 8, wherein the second mask process includes:
forming a first transparent conductive layer on the insulation layer in which the first to third contact holes are formed;
forming a second photo-resist pattern through a photolithography process using a second mask; and
exposing and developing the first transparent conductive layer using the second photo-resist pattern as a mask, and removing the exposed and developed portions of the first transparent conductive layer by an etching process, thereby forming the first connection patterns in the electrode forming part, wherein the first connection pattern has a second thickness smaller than the first thickness.

10. The method of claim 9, wherein the second thickness is set to $1/12$ to $1/4$ of the first thickness.

11. The method of claim 8, wherein each of the first electrode patterns has a polygonal shape and each side is connected to one static electricity discharging pattern.

* * * * *